US012638005B2

(12) United States Patent
Yowell

(10) Patent No.: US 12,638,005 B2
(45) Date of Patent: May 26, 2026

(54) FABRICATION AND TRANSPORT TOOLING

(71) Applicant: ARVOS LJUNGSTROM LLC, Wellsville, NY (US)

(72) Inventor: Jeffrey Yowell, Portville, NY (US)

(73) Assignee: Arvos Ljungstrom LLC, Wellsville, NY (US)

( * ) Notice: Subject to any disclaimer, the term of this patent is extended or adjusted under 35 U.S.C. 154(b) by 0 days.

(21) Appl. No.: 19/136,129

(22) PCT Filed: Dec. 7, 2023

(86) PCT No.: PCT/US2023/082856
§ 371 (c)(1),
(2) Date: Jun. 5, 2025

(87) PCT Pub. No.: WO2024/123980
PCT Pub. Date: Jun. 13, 2024

(65) Prior Publication Data
US 2026/0002516 A1 Jan. 1, 2026

Related U.S. Application Data

(60) Provisional application No. 63/431,524, filed on Dec. 9, 2022.

(30) Foreign Application Priority Data

Mar. 17, 2023 (GB) ...................................... 2303930

(51) Int. Cl.
F03D 13/40 (2016.01)
F03D 13/10 (2016.01)

(52) U.S. Cl.
CPC .......... F03D 13/402 (2023.08); F03D 13/112 (2023.08); F05B 2240/912 (2013.01); F05B 2260/02 (2013.01)

(58) Field of Classification Search
CPC ................. F03D 13/402; F03D 13/112; F05B 2240/912; F05B 2260/02
(Continued)

(56) References Cited

U.S. PATENT DOCUMENTS 3,994,795 A * 11/1976 Kurr ........................ C23F 13/10
138/DIG. 6
4,284,488 A * 8/1981 Brittain ................... C23F 13/10
138/104

(Continued)

FOREIGN PATENT DOCUMENTS

CN        108265305 A      7/2018
JP        2002226983 A      8/2002

OTHER PUBLICATIONS

International Search Report and Written Opinion issued in corresponding PCT Application No. PCT/US2023/082856, date mailed Apr. 30, 2024, pp. 1-43.

(Continued)

*Primary Examiner* — Lawrence Averick
(74) *Attorney, Agent, or Firm* — Robinson & Cole LLP

(57) ABSTRACT

A transport and assembly alignment tool, for prefabrication, transport and/or erection/assembly of a plurality of arcuate segments or near identical modules into a large annular or toroidal structure includes one or more alignment fixtures that have a matched pair of mating alignment members. The alignment members each have a first circularity and/or axial alignment member which aligns to a second circularity and/or axial alignment member. The first circularity and/or axial alignment member is held in alignment with the second circularity and/or axial alignment member by a radially extending alignment feature to establish circumferential alignment thereof and are locked together by locking means. The first axial alignment member is rigidly secured to a first one of the arcuate segments proximate to one circumferen- (Continued)

tial end thereof and the second axial alignment member rigidly secured to a second one of the arcuate segments proximate to one circumferential end thereof.

14 Claims, 10 Drawing Sheets

(58) Field of Classification Search
    USPC ........................................ 29/897.3, 897, 592
    See application file for complete search history.

(56) References Cited

U.S. PATENT DOCUMENTS

| | | | | |
|---|---|---|---|---|
| 4,477,204 | A * | 10/1984 | Rohde | E21D 11/083 |
| | | | | 405/152 |
| 7,160,085 | B2 * | 1/2007 | de Roest | E04H 12/16 |
| | | | | 52/849 |
| 10,041,479 | B2 * | 8/2018 | Pedersen | E04H 12/085 |
| 10,138,649 | B2 * | 11/2018 | Pedersen | F03D 80/70 |
| 11,015,579 | B2 * | 5/2021 | Mathew | F03D 13/40 |
| 11,971,012 | B2 * | 4/2024 | Saez Anthonisen | F03D 13/20 |
| 2005/0129504 | A1 * | 6/2005 | De Roest | E04H 12/16 |
| | | | | 415/4.2 |
| 2010/0071301 | A1 * | 3/2010 | Herrius de Roest | F03D 13/20 |
| | | | | 52/651.07 |
| 2013/0000241 | A1 * | 1/2013 | Jensen | F03D 13/10 |
| | | | | 52/651.01 |
| 2017/0030101 | A1 * | 2/2017 | Pedersen | B65G 57/03 |
| 2017/0122292 | A1 * | 5/2017 | Michel | B21D 47/01 |
| 2020/0378365 | A1 * | 12/2020 | Mathew | F03D 13/40 |

OTHER PUBLICATIONS

International Preliminary Report on Patentability issued in corresponding PCT Application No. PCT/US2023/082856, date mailed Nov. 12, 2024, pp. 1-6.

* cited by examiner

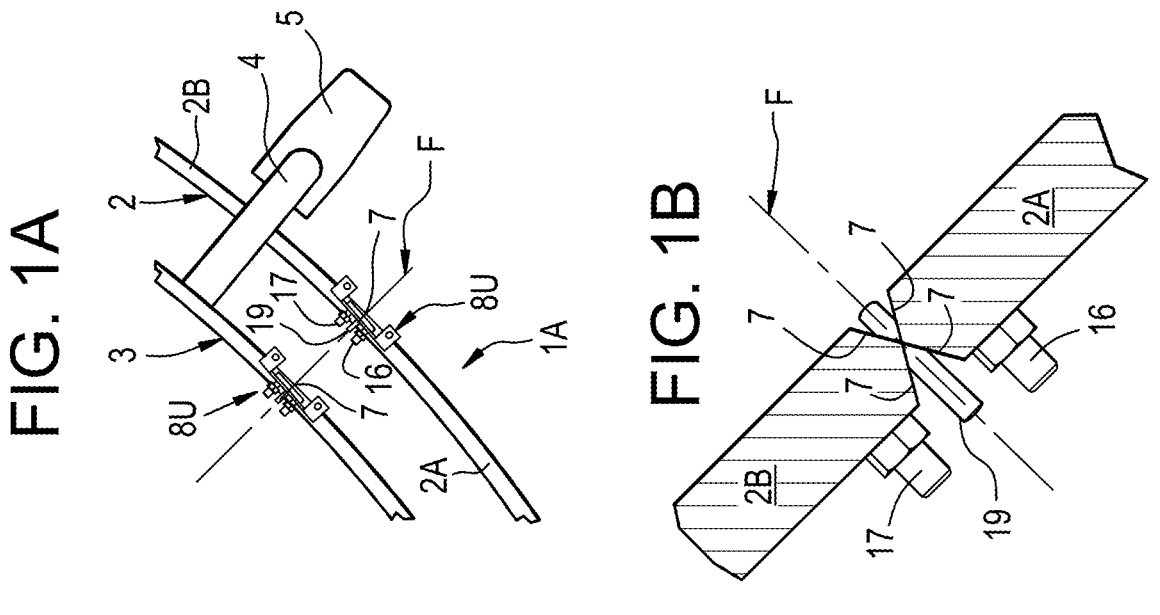
FIG. 1A
FIG. 1B
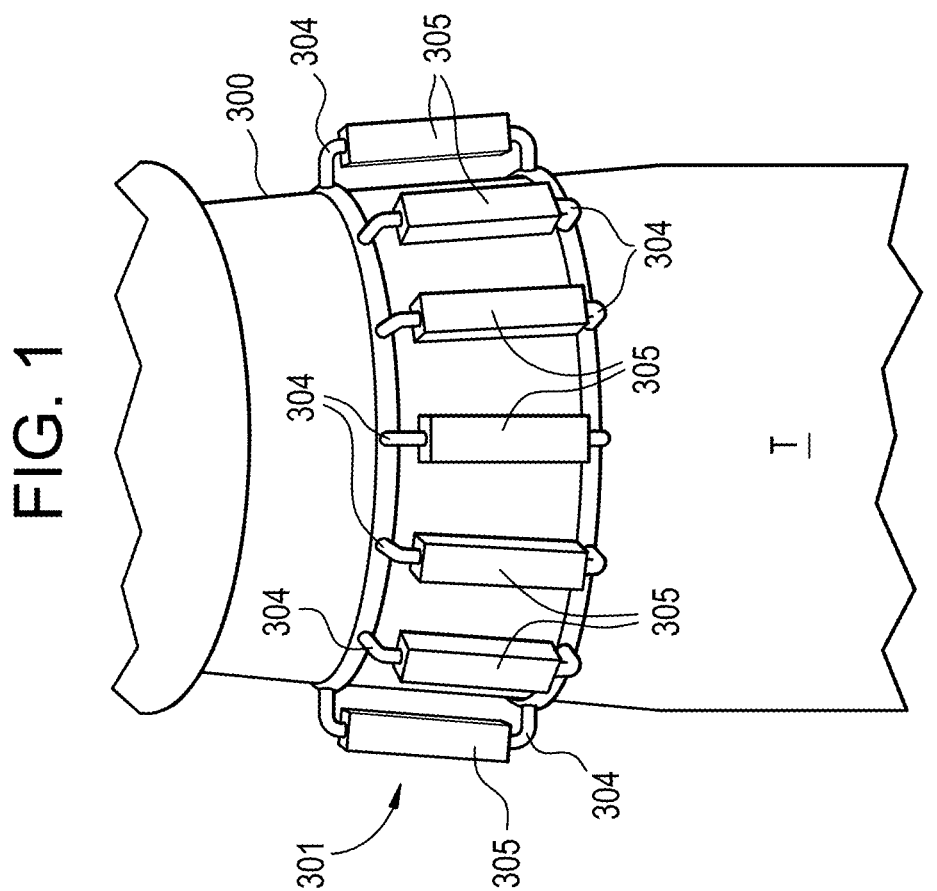
FIG. 1

FABRICATION AND TRANSPORT TOOLING

CROSS-REFERENCE TO RELATED APPLICATIONS

The instant application is a non-provisional application of, and claims priority to, International Application No. PCT/US2023/082856, filed on Dec. 7, 2023, which is a PCT Application of and claims priority to U.S. Provisional Application No. 63/431,524, filed on Dec. 9, 2022, and GB Application No. 2303930.8, filed on Mar. 17, 2023, both of which are incorporated by reference in their entireties.

FIELD

The present invention relates to fabrication and transport tools generally, and more particularly to such a tool adapted to facilitate maintaining the desired circularity of arcuate segments of a large annular structure during fabrication and/or final assembly and transport by road and/or narrow barge.

BACKGROUND

Manufacturing any large annular structure for transport by road in a single piece is not feasible if its diameter is too large, because it must be loaded on the bed of a truck and must be able to travel in highway lanes passing under bridges, for example. Also, when such a structure is made from structural steel, weight might be a consideration. Thus, for transport, it is desirable that the annular structure is prefabricated in arcuate segments which are individually transportable, preferably all loaded on the bed of a truck, for final assembly on site or at the dockside prior to shipment offshore, for example.

One example of such annular structures are the upper and lower rings of anode cages for offshore wind towers. Typically, as illustrated in FIG. 1, a monopile or stanchion of an offshore wind tower T has an underwater frustoconical lower portion 300 upon and around which an anode cage 301 of known design is in use. The anode cage 301 comprises a pair of annular lower and upper steel rings 302 and 303, respectively, fabricated from heavy duty structural steel bar of rectangular cross-section axially spaced apart by a plurality of radially spaced apart anode carriers 304 fabricated from heavy duty steel rod of circular cross section. The carriers 304 are each welded or otherwise mechanically connected at their respective upper end to the outer periphery of the lower ring 302 and at their respective lower end to the outer periphery of the upper ring 303. In between their ends, the carriers 304 each have an elongate central portion generally parallel to and spaced apart from the frustoconical portion or frustrum 300. On each such central portion of carriers 304 is located a respective sacrificial anode 305 with each being an elongate aluminum billet having a bore through which the associated steel rod passes and similarly in use being parallel to and spaced apart from the frustoconical portion 300. The form and function of such anode cages 301 is well known and it will be understood that the sacrificial aluminum billets 305 are in use subject to cathodic erosion then not suffered by the frustrum 300 or indeed any submerged portion of the monopile and remain in place for the working life of its wind tower T.

Typically, during construction, such an anode cage 301 is fabricated onshore and then transported from a dock by sea going barge or ship in one piece and heavy crane lifted over a monopile in construction and simply dropped above the frustrum 300 of the monopile, and gravity takes care of the rest. The costs of dockside fabrication are in the order of magnitude three times that of fabrication in factory condition. However, anode cages have inside diameters greater than 10 meters and it is impractical due to size and/or weight to fabricate these in one piece in a factory remote from the dockside and then transport them by road or rail to an awaiting barge or ship.

Designs of galvanic anodes akin to anode cages have been proposed in U.S. Pat. No. 4,284,488A (Brittain et al.) CN108265305A (Yandong) which facilitate their prefabrication and in situ assembly around a cylindrical under water portions of pipes and/or drilling platform stanchions. However, both designs as therein described require a two-part bracelet construction where the upper and lower anode cage rings, straps or iron/ferrous cores, operating akin to a typical pipe clamping bracket, must be clamped to the pipe or stanchion to achieve circularity and structural rigidity. Clamping is achieved by bolts extending between radial tabs, clamp plates or outer plates which are formed integrally with the rings themselves by bending the ends thereof. Pre-fabrication is facilitated by using a tubular member having an outer surface of like diameter to the monopile and in Brittain et al. a first embodiment at one bracelet ends utilizing a U-bolt to provide an articulated hinge facilitative of sub-sea installation. In a second embodiment, illustrated in its FIGS. 12 & 13, Brittain et al. in place of the U-bolt uses a single hinge bolt extending through two hinge plates each welded to a respective bracket welded to a one of the immediately adjacent clamp plate and strap formations. It is suggested that, to make the fitting of this hinge assembly more positive, the brackets could be sized so that their opposing faces or edges act as end stops and are in contact when bracelet is assembled, i.e., when the bracelet is closed about and with the bolt at its other open end clamping it to the pipe or stanchion. A great disadvantage of such designs is that they cannot be finally assembled in a factory setting or dockside and both require divers working offshore to clamp them finally into place whilst they are being held in position, i.e., generally horizontally. An even greater disadvantage is that whilst such a bracelet pipe clamping configuration might be suitable for the relatively small diameter of a pipe or drilling platform stanchion, they are wholly unsuitable for anode cages having the very large diameters required for offshore wind turbine monopiles. Moreover, intrinsically the nature of a cage structure, being much more rigid and/or structurally independent compared to a bracelet, as well as the sheer size of the proposed anode for use with offshore wind turbines and the like, brings significant weight implications typically beyond the ability for manhandling.

It is an object of the invention to provide fabrication and transport tooling to overcome some of if not all the discussed disadvantages. Additionally, it is another object of the invention to provide such a tool that can be used with the fabrication and transport of other large scale annular or toroidal structures where circularity and structural rigidity upon and/or immediately prior to final installation is desired.

SUMMARY OF THE INVENTION

A transport and assembly alignment tool for prefabrication, transport and/or erection or final assembly of a plurality of arcuate segments into a large annular or toroidal structure, which during final assembly enables the circumferential alignment and facilitates subsequent permanent attachment of the arcuate segments end-to-end to create an annulus or ring that can maintain its circularity and structural integrity without the external support of the tool permitting post-assembly removal of the tool, and includes one or more alignment fixtures that have a matched pair of mating alignment members separate and distinct from the arcuate segments or modules. The alignment members each have a first circularity and/or axial alignment member which mates and aligns circumferentially to a second circularity and/or axial alignment member. The first circularity and/or axial alignment member is held in alignment with the second circularity and/or axial alignment member by a radially extending alignment feature to establish circumferential and tangential alignment thereof and are locked together by locking means. The first axial alignment member is rigidly but removably secured to a first one of the arcuate segments proximate to one circumferential end thereof and the second axial alignment member is rigidly but removably secured to a second one of the arcuate segments proximate to one circumferential end thereof.

In some embodiments, the transport and assembly alignment tool has a plurality of bracing members that are removably secured to a corresponding one of the arcuate segments for ensuring maintenance of arcuate circularity during transportation and erection/assembly thereof. Each bracing member includes an elongate crossmember or tie-rod that has a first tie-rod end and a second tie-rod end each rigidly and removably attached directly or indirectly to the corresponding arcuate segment respectively at or adjacent to opposing circumferential ends thereof. The first tie-rod end is rigidly and removably attached directly or indirectly to a corresponding circularity alignment member at a location proximate to a first circumferential end of the arcuate segment. The second tie-rod is rigidly and removably attached directly or indirectly to another circularity alignment member at a location proximate to a second circumferential end of the arcuate segment.

In some embodiments, the transport and assembly alignment tool includes an alignment mechanism that is part of the alignment fixture and includes mechanical fasteners and corresponding oversized bores to facilitate coarse alignment of the pair of mating alignment members and a taper pin to facilitate fine alignment of the pair of mating alignment members. After the fine alignment adjustment is made, the position of the first axial alignment member (and the first arcuate segment) relative to the second axial alignment member (and the second arcuate segment) is locked in place and maintained by the clamping force of provided by the tightening of the fasteners.

In some embodiments, transport and assembly alignment tool the bracing member is adjustable in length and is either in tension or compression.

In some embodiments, the transport and assembly alignment tool is configured to be used in the prefabrication, transportation and final assembly of an anode cage for an offshore wind turbine monopile.

There is further disclosed a method of aligning three or more contiguous arcuate segments of a large annular structure during prefabrication, transportation and final assembly. The method includes providing the transport and assembly alignment tool described above. As a first step, the arcuate segments are laid in an assembly area in an end-to-end manner upon a horizontal plane and in the correct circular alignment about a center reference point with one arcuate segment being flanked by the other two arcuate segments. As a second step, a first alignment fixture in a locked alignment state is then attached both to a central one of the arcuate segments and to one arcuate segment adjacent thereto and with the first alignment member being rigidly attached to the central one of the arcuate segments and with a second alignment member being rigidly attached to the one arcuate segment adjacent to the central one of the arcuate segments. A second alignment fixture, in its locked state, is then attached to both the central one of the arcuate segments and to the other arcuate segment adjacent with the first alignment member of the second alignment fixture being rigidly attached to the central segment and with its second alignment member being rigidly attached to the one flanking segment or vice versa with the rigid attachments being either permanent or temporary. As a third step, a bracing member is rigidly but removably attached at one end thereof directly or indirectly to the alignment member of the first alignment fixture attached to central segment and rigidly but removably attached at its other end directly or indirectly to the alignment member of the second alignment fixture attached to the central segment. As a fourth step, the central segment is readied for individual transport by detaching it from the flanking segments by disengaging the radially extending alignment features and locking means and separating respective first and second alignment members of the first alignment fixture and corresponding first and second alignment members of the second alignment fixture so that they are each in an unlocked or unattached state.

In some embodiments, the method of aligning at least three contiguous arcuate segments of a large annular structure during final assembly includes as a fifth step that the unlocked or unattached alignment fixtures are on-site realigned and brought into and subsequently clamped in their respective locked state to bring the central segment into circular alignment with both the flanking segments. As a sixth step, rigidly attaching the flanking segments respectively to the central segment by welding or other functionally permanent mechanical attachments. And as a seventh step removing bracing member from the transport and assembly alignment tool as shipped.

In some embodiments, the method in which the bracing member is an adjustable tie-rod or strut, the alignment fixture has an alignment mechanism in which mechanical fasteners facilitate coarse alignment thereof and an axially extending alignment feature subsequently facilitates fine alignment and having a subsidiary step between the fifth and sixth step wherein the tie-rod is adjusted in length to facilitate coarse alignment of the alignment mechanism.

There is yet further disclosed a method of aligning three or more contiguous arcuate segments of a large annular structure during prefabrication, transportation and final assembly. The method includes providing the transport and assembly alignment tool described above. As a first step, the arcuate segments are laid in an assembly area in an end-to-end manner upon a horizontal plane and in the correct circular alignment about a center reference point with one arcuate segment being flanked by the other two arcuate segments. As a second step, a first alignment fixture in a locked alignment state is then attached both to a central one of the arcuate segments and to one arcuate segment adjacent thereto and with the first alignment member being rigidly attached to the central one of the arcuate segments and with a second alignment member being rigidly attached to the one arcuate segment adjacent to the central one of the arcuate segments. A second alignment fixture, in its locked state, is then attached to both the central one of the arcuate segments and to the other arcuate segment adjacent with the first alignment member of the second alignment fixture being rigidly attached to the central segment and with its second alignment member being rigidly attached to the one flanking segment or vice versa with the rigid attachments being either permanent or temporary. As a third step, the central segment is readied for individual transport by detaching it from the flanking segments by disengaging the radially extending alignment features and locking means and separating respective first and second alignment members of the first alignment fixture and corresponding first and second alignment members of the second alignment fixture so that they are each in an unlocked or unattached state.

In some embodiments, the yet further method of aligning at least three contiguous arcuate segments of a large annular structure during final assembly includes as a fourth step that the unlocked or unattached alignment fixtures are on-site realigned and brought into and subsequently clamped in their respective locked state to bring the central segment into circular alignment with both the flanking segments. As a fifth step, rigidly attaching the flanking segments respectively to the central segment by welding or other functionally permanent mechanical attachments. And as an optional sixth step the alignment fixtures may be detached from the fully assembled large annular structure.

In some embodiments, the transport and assembly alignment tool includes the alignment fixture having a first mounting leg and a second mounting leg on an axial edge thereof and the first mounting leg is secured to a first axial end of a first of the arcuate segments and the second axial leg is secured to a second axial end of a second of the arcuate segments. In such embodiments, the transport and assembly alignment tool includes the first mounting leg positioned entirely radially outward from the inner peripheral surface of the first of the arcuate segments and the second mounting leg is positioned entirely radially outward from the inner peripheral surface of the second of the arcuate segments.

Another aspect of the invention is to provide fabrication in at least 3, 4 or more arcuate segments to facilitate onshore transport with final assembly dockside for subsequent offshore transport to its designated wind tower under construction. While doing so presents a problem insofar as whilst in shopfloor conditions it is relatively easy to accurately locate static jigs about a fixed axis point to facilitate fabrication of arcuate anode cage sections in circular alignment it is not so easy to realign these for final assembly on a dockside under the care of site workers lacking the accurate alignment tools typical in a factory setting. Additionally, there is no guarantee during transport that the arcuate segments will maintain their shape, thus making accurate alignment nigh impossible without some bending of the arcuate segments during final assembly.

Accordingly, an aspect of the invention provides a modular prefabrication of an anode cage or large annular/toroidal structure/framework being an arcuate segment thereof is in accordance with another aspect of the invention prefabricated, transported and/or assembled together with other such modular prefabrications utilizing the transport and assembly alignment tool and/or in accordance with the method of other embodiments of the invention. This modular prefabrication or arcuate segment is typically one of at least three, preferably four, such near identical prefabrications being transportable as a matched set on the flatbed of a road going truck.

In accordance with a further aspect of the inventions a modular arcuate prefabrication of an anode cage or large annular/toroidal structure/framework is one of at least three, preferably four or five, such identical or near identical prefabrications or modules being transportable as a set on the flatbed or flatbeds for road going trucks. To ensure accurate alignment to within a desired degree of tolerance, say between 0.5 mm to 2 mm, of contacting arcuate end faces or portions of the prefabrications required for permanent attachment thereof during final assembly is facilitated by means of a plurality of alignment fixtures, corresponding to the number of arcuate prefabrications, with each fixture comprising a respective adjustable bracing member removably attachable adjacent the arcuate end faces or portions of the arcuate prefabrication to which it corresponds and which is in use disposed radially inwardly of that arcuate prefabrication to be adjustable in length to ensure the effective radius of that arcuate prefabrication is brought into tolerance prior to the permanent attachment.

Typically, the contacting end faces or portions each describe one side of a weld bevel arrangement at say a field split requiring alignment to within a desired tolerance of say 1 mm to another corresponding such side prior to permanent attachment by welding. Post-welding, i.e., after final assembly, the bracing members are structurally redundant and removed from the fabricated structure.

A plurality of these aforementioned modular prefabrications may be utilized in a method of prefabricating, transporting and finally assembling an anode cage of modular design. Herein the matched set once finally assembled may be either the complete anode cage or large annular/toroidal structure/framework or an arcuate portion thereof with another or the other arcuate portion being an identical or near identical matched set. It will be appreciated therefore that the prefabrications or modules are each significant in size and weight for the given application and might be some 3 meters or so long and depending on exact materials used some 4500 kg and more in weight including the alignment fixtures. Typically, the anode cage itself might be 10 meters in diameter and some 18000 kg in weight.

BRIEF DESCRIPTION OF THE DRAWINGS

FIG. 1 is a schematic perspective view of a typical anode cage design installed around a subsea portion of an offshore wind tower monopile;

FIG. 1A is a partial axial top-down view of a joint of two annular segments of an anode cage of design held together by alignment fixtures across a field split F in accordance with the invention;

FIG. 1B is a partial axial cross-sectional view of the joint in FIG. 1A;

FIG. 4 is a diagrammatic illustration of bracing assembly in the form of an adjustable tie-rod assembly comprised of an aspect of the first embodiment of the invention with a central section thereof omitted for ease of illustration;

FIG. 6A illustrates detail 6AB of FIGS. 6C and 6D when the illustrated alignment fixture is in preferred tangential alignment.

FIG. 6D is a diagrammatic representation in plain view of the prefabrication layout and alignment of four arcuate segments of the lower annular ring maintained in circular and axial alignment by a corresponding plurality of alignment fixtures 8U, 8L cooperating with a corresponding plurality of bracing assemblies.

DETAILED DESCRIPTION

Figures 2A, 2B:
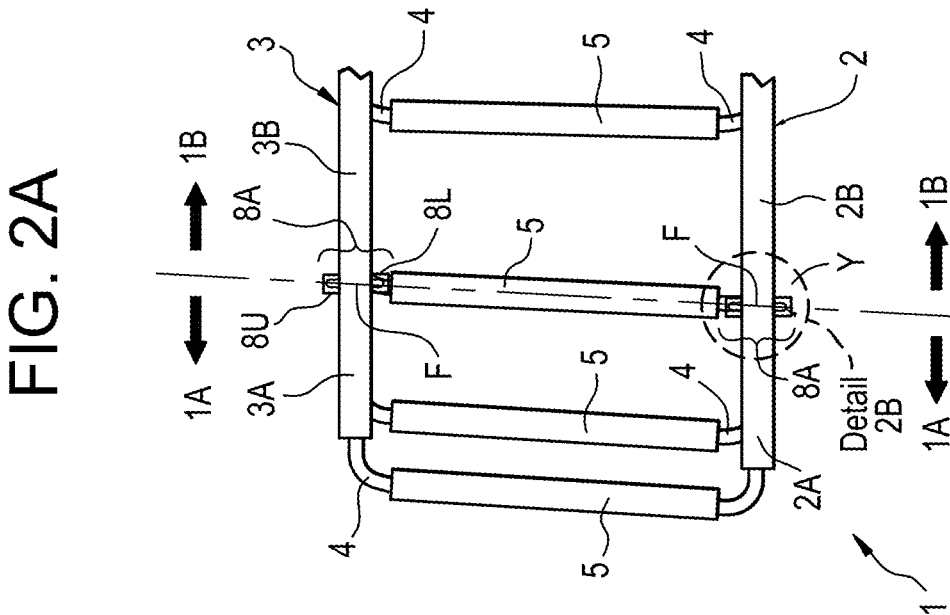
FIG. 2A is a perspective radial view of a portion of an anode cage having two matched pairs of alignment fixtures installed respectively to upper and lower annular rings thereof separating two radial segments thereof.
FIG. 2B is a perspective radial view of detail Y of a lower one of the matched pairs of alignment fixtures illustrated in FIG. 2A with the left side of the anode cage being here shown at the bottom of the figure.

Anode cage 1, partially illustrated in FIG. 2A and constructed similarly to the anode cage 301, has a lower large diameter annular ring 2 concentric with an upper annular ring 3 of smaller diameter spaced apart by a plurality of circumferentially distributed anode carriers 4, each of which has a sacrificial aluminum anode or billet 5 mounted thereon. Like anode cage 301, anode cage 1 is upon final dockside assembly intended to be structurally rigid, self-supporting, readily transportable by barge and simply dropped into place onto a monopile under construction without any subsequent sub-sea installation, e.g., such as is required for articulated bracelet type anode cages.

Figure 3:
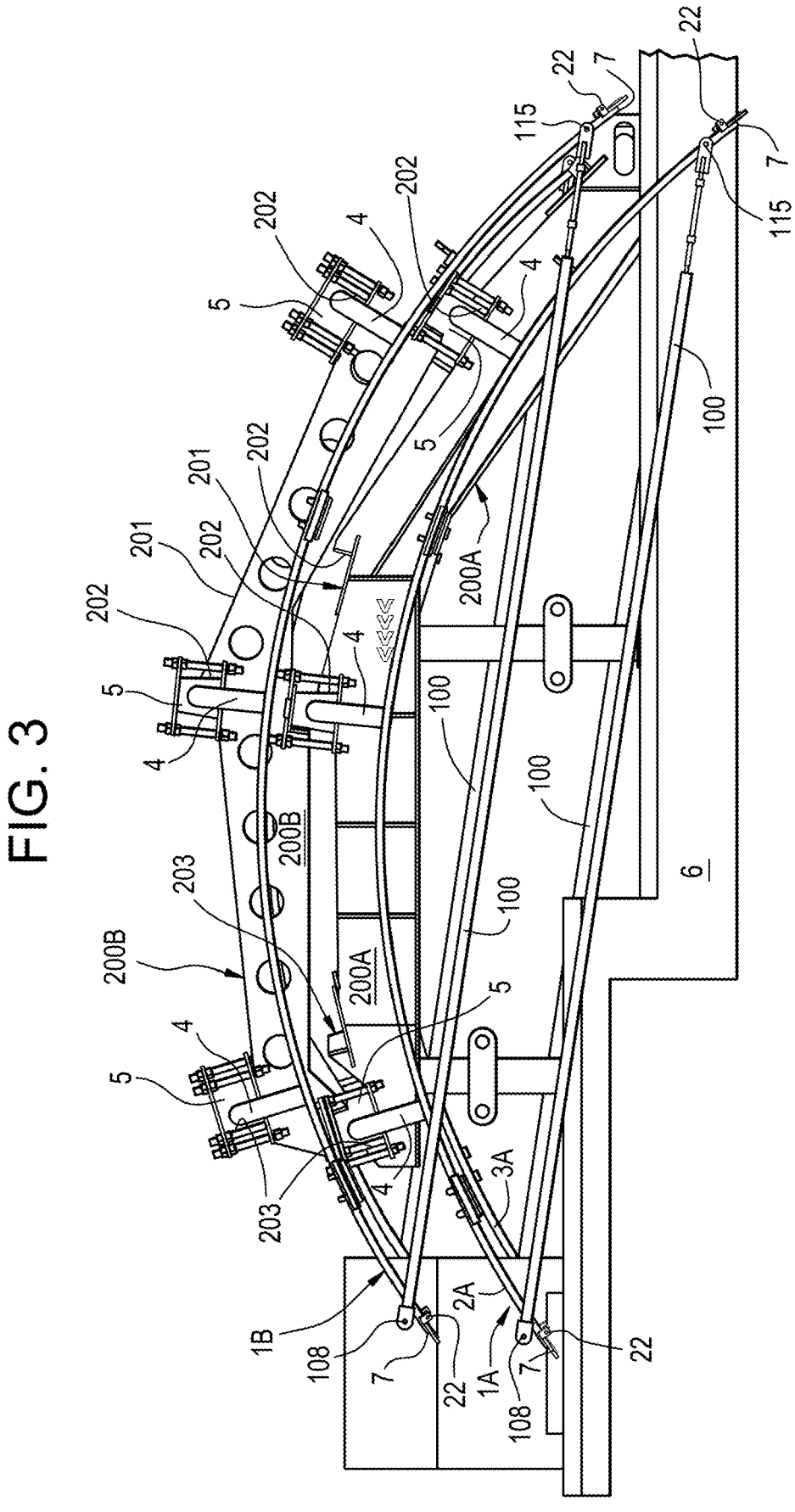
FIG. 3 is a diagrammatic illustration of two of four arcuate segments of an anode cage loaded for transport upon the front half of a flat bed of a truck utilizing both a plurality of the alignment tools in transport mode in accordance with the first embodiment and further shipping bracketry in accordance with a second aspect of the invention.

For ease of transport, each anode cage 1 is of prefabricated modular construction comprising four factory made prefabrications being respectively four arcuate segments 1A, 1B, 1C, 1D (see FIG. 7) designed to be carried as a modular set of four on the flatbed 6 of a truck, the front half of which is shown in FIG. 3 loaded with a first arcuate segment 1A loaded generally beneath a second arcuate segment 1B. It will be understood that both during shopfloor prefabrication and final assembly dockside the four prefabrications or arcuate segments 1A, 1B, 1C, 1D must be connectable at respective opposed field splits F, as shown in FIG. 1B, in a manner that ensures the circularity of the annular rings 2,3 within the desired manufacturing tolerances. In FIG. 2A, the annular segment 1A is shown to the left of the dotted line dissecting two associated fields splits F whilst the annular segment 1B is shown to the right thereof.

Lower annular ring 2 is fabricated from four arcuate lengths or sections 2A, 2B, 2C, 2D (see FIG. 6D) of structural steel bar having an axially elongate rectangular cross-section created by bending, pressing or otherwise forming flat stock in known fashion which when assembled end to end resulting in the desired annulus 2. Upper annular ring 3 is similarly fabricated from four arcuate lengths or sections of the same steel bar stock formed to describe in use the smaller diameter of annulus 3 with two such arcuate sections 3A, 3B, 3C, 3D being illustrated in FIG. 7. Each of the carriers 4 is secured (e.g., via welding) to a portion (e.g., radially outer portion) of each of the arcuate lengths or sections 2A, 2B, 2C, 2D and each of the four arcuate lengths or sections 3A, 3B, 3C, 3D to rigidly space the annulus 2 and the annulus 3 apart from one another as shown in FIG. 7. The circumferential ends of all arcuate sections each are provided with a respective axial chamfered edge 7 at the associated field split F having chamfers radially outwardly and outwardly thereof that during final dockside assembly provides guides for welding immediately adjacent and contacting ends of arcuate sections permanently together along the chamfered edge.

It will be readily understood that during final assembly, correct alignment of the opposing pairs of chamfered edges 7 is essential if the desired circularity of the associated annular ring 2, 3 is to be achieved. To ensure this circularity is achieved within manufacturing tolerances, a plurality of alignment fixtures 8 in accordance with a first embodiment of the invention are used to bring the chamfered edges 7 of immediately adjacent arcuate sections, e.g., 2A and 2B, into alignment during final dockside assembly. Final assembly in simple terms requires that opposing chamfered edges 7 are permanently welded together to create, and maintain the structural integrity of, annular rings 2, 3 that are circular, structurally rigid and self-supporting regardless of whether or not the alignment fixtures 8 remain post welding attached thereto.

One such alignment fixture 8 for connecting arcuate sections 2A, 2B of annular ring 2 at their respective chamfered edges 7 is illustrated in use in FIG. 2B and in the detailed design views of its upper portion 8U in FIG. 5. Fixture 8 has as its lower portion 8L a mirror image of the upper portion 8U and the two portions are in this first embodiment of the invention separate fixtures. The following detailed discussion of the construction, function and use of its upper portion 8U should be taken as indicative of that of its lower portion 8L and where illustrated suffix L denotes equivalence to the numbered feature described for the upper portion 8U, and for all other such alignment fixtures 8 or upper/lower parts thereof used in the factory prefabrication and dockside final assembly of the four arcuate segments 1A, 1B, 1C, 1D of anode cage 1.

Figures 5A, 5B, 5C:
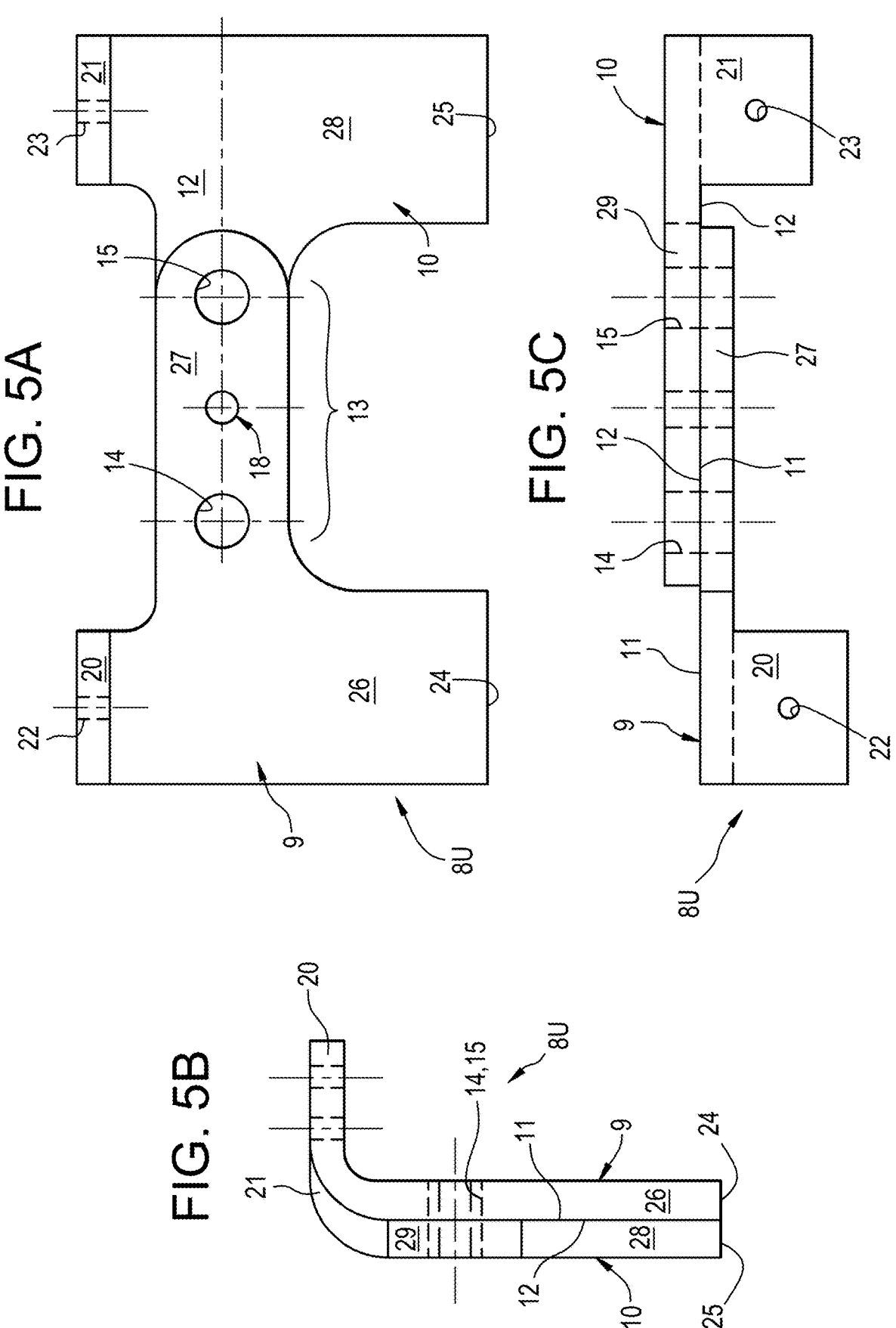
FIG. 5A a detailed drawing of the radial front view of an upper portion of one of the previously illustrated matched or mirror image pairs of alignment fixtures.
FIG. 5B is a circumferential side view of the alignment fixtures illustrated in FIG. 5A.
FIG. 5C is an axial plan view of the alignment fixtures illustrated in FIGS. 5A and 5B.

With reference to FIG. 5A, the upper portion 8U of alignment fixture 8 has a matched pair of alignment members 9 and 10 with the first alignment member 9 having a radially outer axial surface 11 in contact with and disposed radially outwardly of a radially inner axial surface 12 of the second alignment member 10, as shown in FIG. 5C. Additionally, the fixture 8 at its upper portion 8U has a locking tangential, circumferential or annular ring periphery alignment mechanism 13 comprising in this embodiment a coarse alignment feature provided by bolt holes 14, 15 extending radially through alignment members 9 and 10 to receive respectively bolts 16 and 17 (as shown in FIG. 2B) and a fine alignment feature provided by bore 18 similarly extending radially through alignment members 9 and 10 to receive a taper pin 19. The bores 16, 17 and 19 are drilled and/or machined suitably centered along an axial plane of anode cage 1 with the members 9 and 10 rigidly clamped together to ensure respective alignment thereof when first the shanks of bolts 16 and 17 are placed in situ for coarse alignment, subsequently the taper pin 19 is driven into place for fine alignment and the bolts lastly tightened to maintain or lock alignment. Similarly, in a lower portion 8L of the alignment member 8 illustrated in FIG. 2A its tangential alignment mechanism 13L is maintained in alignment when its bolt 16L, bolt 17L and taper pin 19L are inserted into their corresponding bores (not shown) and bolts 16L,17L tightened. With both pins 19, 19L inserted and all bolts 16, 17, 16L, 17L in place and tightened, this alignment feature 8 is in a locked alignment state.

Additional to alignment mechanism 13, the alignment members 9, 10 each have a respective tie-rod bracket 20, 21 extending laterally or radially outward (i.e., away from axis P, see FIGS. 6C and 6D) generally perpendicular from the upper end respectively thereof. Tie-rod bracket 20 is provided with a tie-rod end locating feature being in this embodiment a through bore 22 to receive one end of a tie-rod assembly 100, shown in FIG. 4 as hereinafter described. Similarly, bore 23 extends through tie-rod bracket 21 to receive one end of another second tie-rod assembly 100 in a manner as hereinafter described. The axially lower extent of the upper portion 8U of alignment fixture 8 is defined in FIGS. 5A and 5B by its bottom edges 24, 25 respectively for alignment member 9, 10.

The lower portion 8L of alignment fixture 8 being a mirror image of the upper portion 8U similarly has in addition to its tangential alignment mechanism 13L a pair of tie-rod brackets 20L, 21L extending laterally or radially inwardly generally perpendicular from the lower end respectively thereof with tie-rod end locating features being respective through bore 22L, 23L (not shown).

Upper and lower portions 8U, 8L of alignment member 8 are each of machined construction formed from heavy rolled and/or plate steel stock advantageously having a thickness about half that of the stock used for annular rings 2 and 3. Upper portion 8U as shown in FIG. 2A has an axial leg 26 extending downwardly from tie-rod brackets 20 terminating at its bottom edge 24 and an upper arm 27 extending laterally or tangentially from leg 26 (in use toward alignment member 10) immediately adjacent tie-rod bracket 20 comprising its bores 14, 15 and 18 of alignment mechanism 13. And alignment member 10 has an axial leg 28 extending downwardly from tie-rod bracket 21 terminating at its bottom edge 25 and an upper arm 29 comprising bores 14, 15 and 18 of alignment mechanism 13. Lower portion 8L is similarly constructed as can be seen from FIG. 2A as indeed are all other portions of all other fixtures 8 utilized as herein described.

Figure 6A:
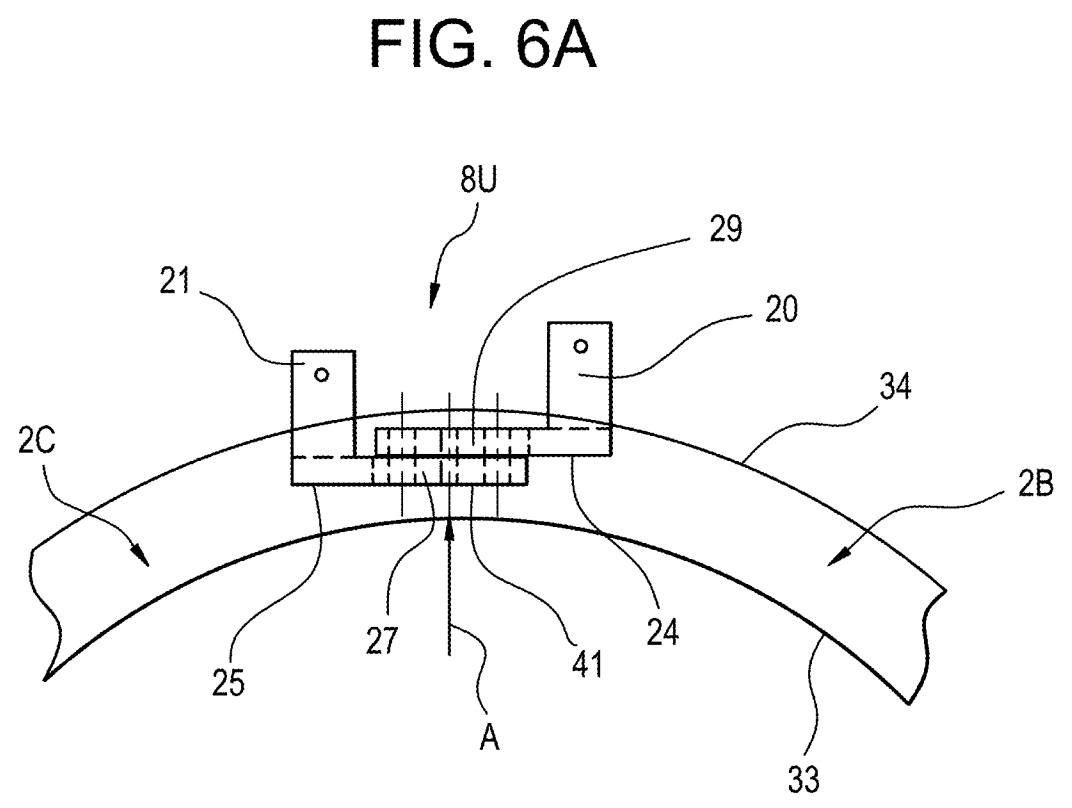

As illustrated diagrammatically in FIG. 6D, during initial fabrication of the lower ring 2 of anode cage 1, the four arcuate sections 2A, 2B, 2C, 2D are placed to lie horizontally (as they would in situ on a monopile) upon a plurality of workshop stands 30 akin to sawhorses with positioning jigs attached thereto (not shown) in the correct circular alignment (as shown in FIG. 2B) for the lower annular ring 2, i.e., concentrically of the desired upright axis of the anode cage 1 and ring 2 passing vertically through center-point P. In correct circular alignment of two arcuate sections 2A and 2B, their respective chamfered edges 7 are axially aligned at their opposing field splits F and in circumferential contact along radially inner edges thereof in such manner that both an inner peripheral surface 31 and outer peripheral surface 32 of arcuate section 2A are respectively in concentric alignment with an inner peripheral surface 33 and outer peripheral surface 34 of arcuate section 2B. The field splits F each separated by 90 degrees from the next will readily be understood to be aligned generally with the dashed axes extending through from point P and thus to avoid cluttering the drawing are not individually marked on FIGS. 6C and 6D. It will be understood that the remaining arcuate sections 2C, 2D of lower annular ring 2 are similarly positioned upon their corresponding stands 30 concentrically and circumferentially aligned with arcuate sections 2A and 2B about point P.

The upper portion 8U of alignment fixture 8A, being a first such alignment fixture 8 constructed as aforedescribed, is in its locked alignment state then offered up to arcuate sections 2A, 2B so that the axially lower extents or edges 24, 25 of legs 26, 28 rest upon respectively axially upper surfaces 35, 36 of the associated arcuate sections 2A, 2B and positioned so that the radial axes of its taper pin 19 is in an upright plane aligned with or generally in parallel to that of the upright radial plane of contacting edges of chamfered edges 7 at respective field split F. The legs 26, 28 are then rigidly attached respectively to corresponding arcuate sections 2A, 2B (respectively for arcuate segments 1A, 1B of anode cage 1) permanently by welding or removably using mechanical attachment means (not shown). In one variant of the invention to forestall or otherwise mitigate against axial warping of annular ring 2, the resulting weld of leg 26 ties it only adjacent the radially inner periphery of surface 35 of arcuate section 2A whilst that of leg 28 ties it to radially outer periphery of surface 34 of section 2B, or vice versa. The lower portion 8L of alignment fixture 8A is similarly installed to ring 2 as shown in FIG. 2B with its legs 26L, 28L being suitably welded respectively to axially lower surfaces 37, 38 of arcuate segments 2A, 2B. An illustrative position of the resulting welds of fixture 8A comprising both 8U and 8L is shown in FIG. 2B by the four thick black lines adjacent the edges respectively 24, 25, 24L, 25L.

Figure 6B:
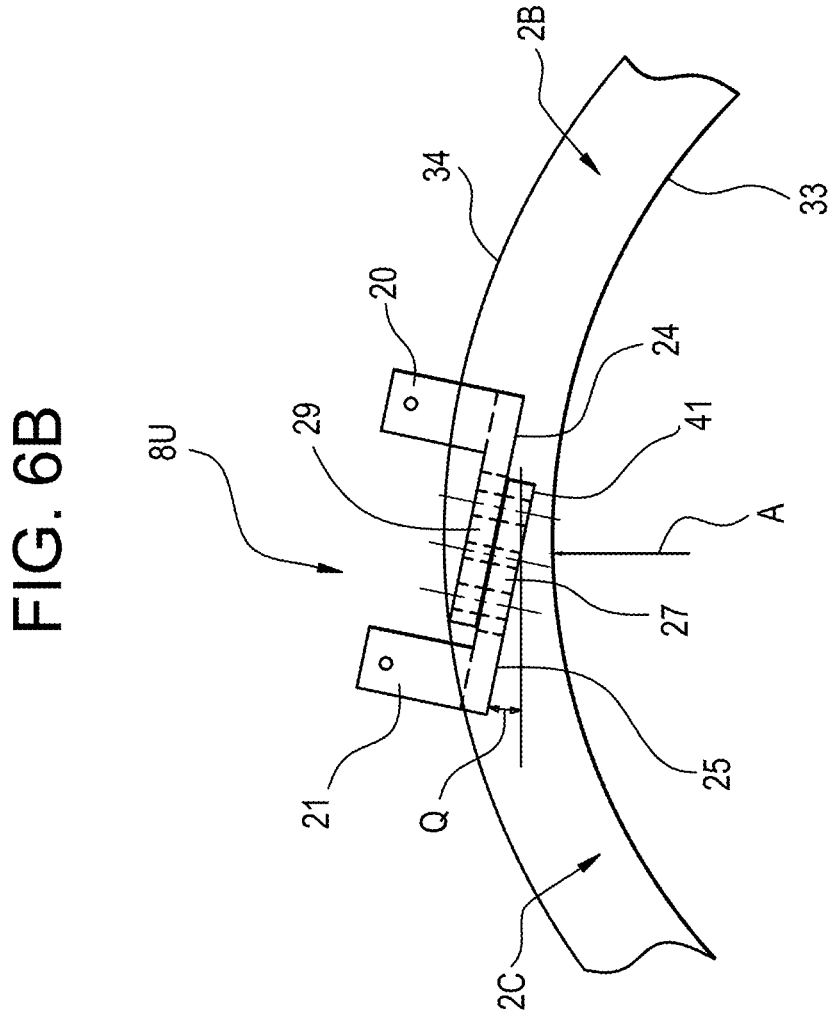
FIG. 6B illustrates detail 6AB of FIGS. 6C and 6D when the illustrated alignment fixture is in skewed but acceptable tangential misalignment.
Figure 6C:
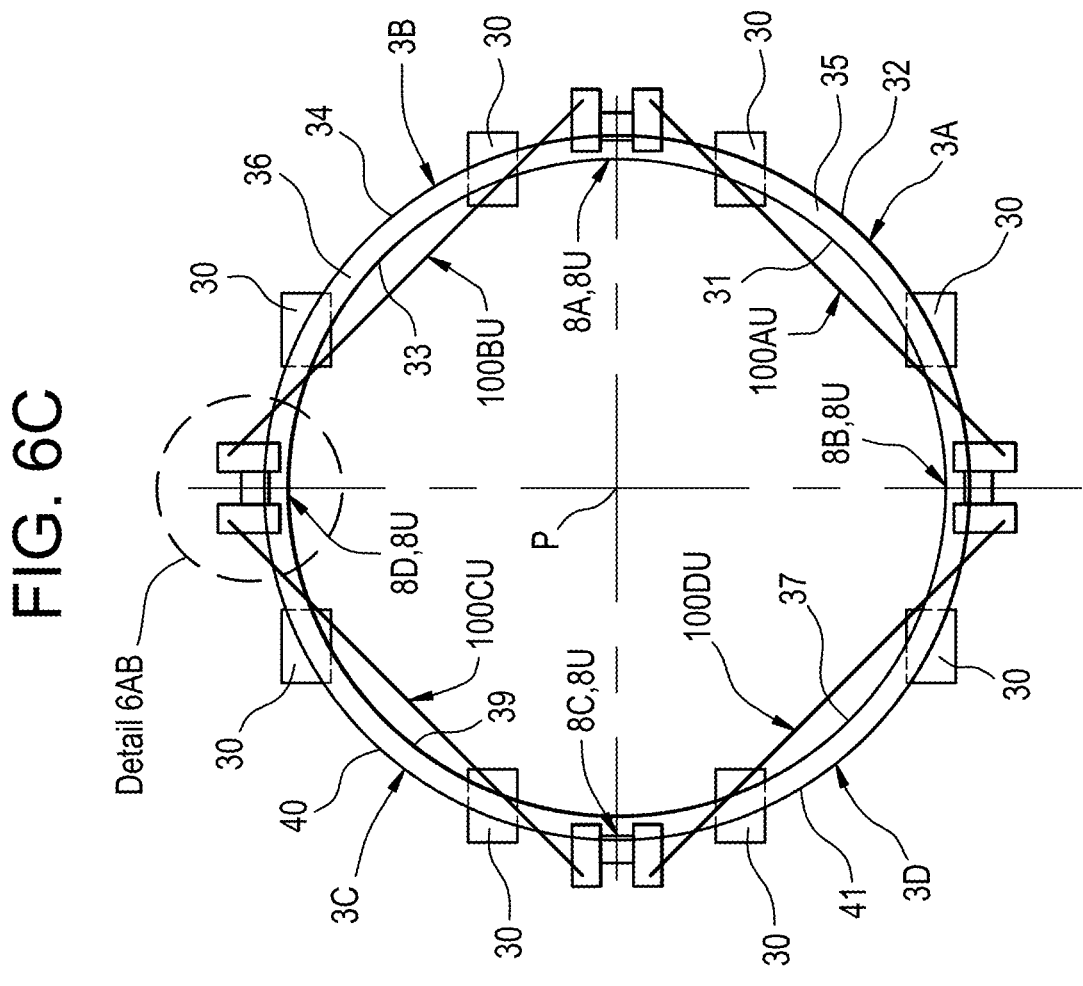
FIG. 6C is a diagrammatic representation in plain view of the prefabrication layout and alignment of four arcuate segments of the upper annular ring maintained in circular and axial alignment by a corresponding plurality of alignment fixtures 8U, 8L cooperating with a corresponding plurality of bracing assemblies.
Figure 6D:
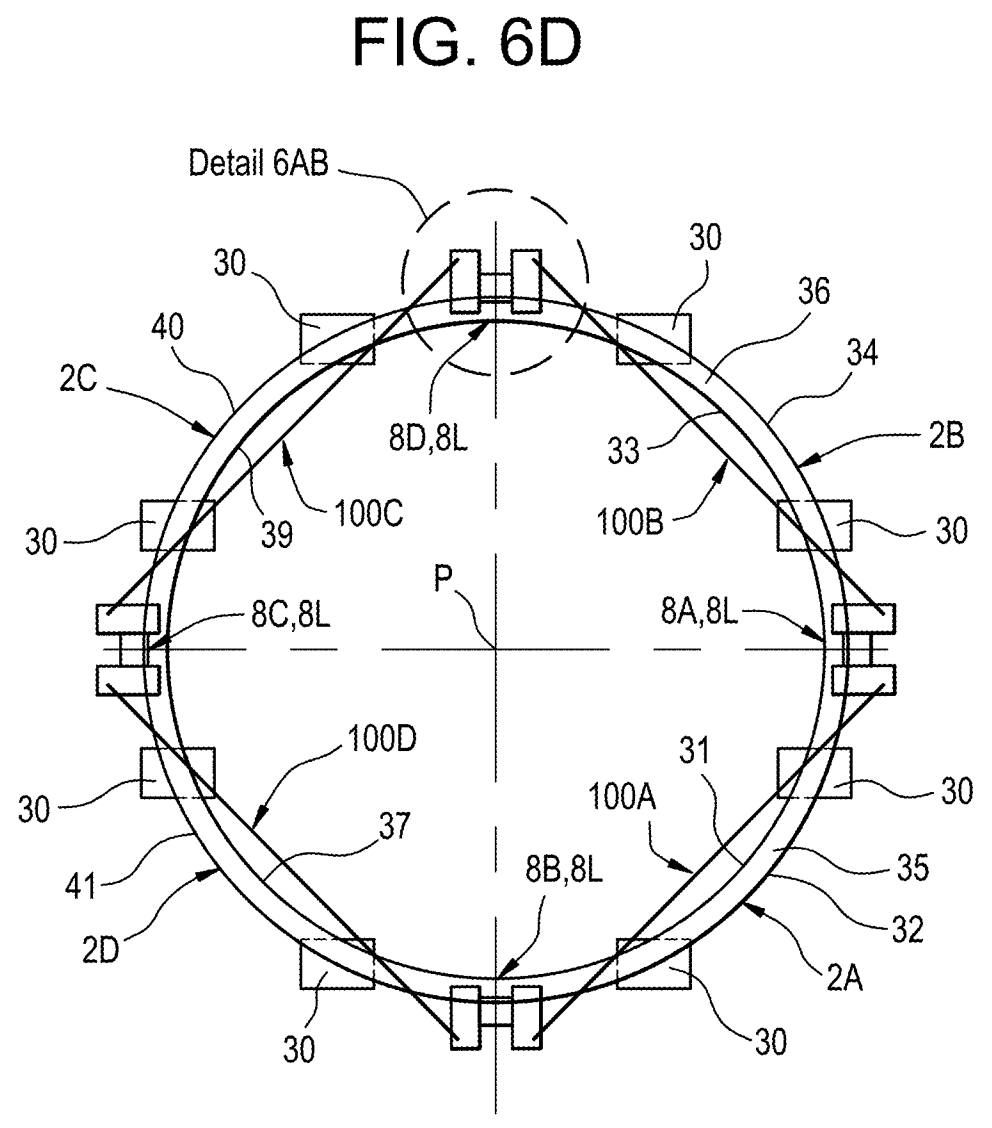
Figure 7:
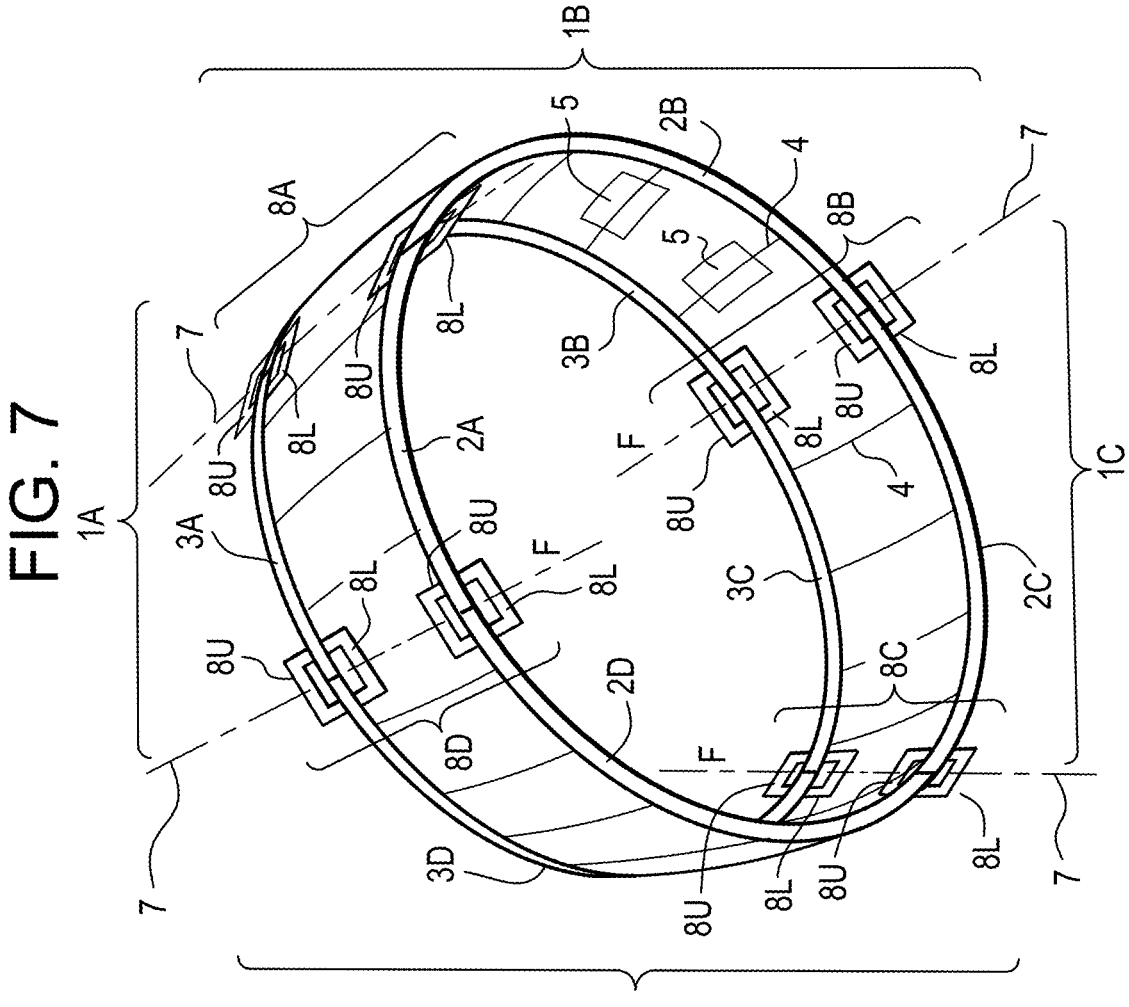
FIG. 7 is a schematic perspective view of the anode cage shown in a segmented configuration.

Referring to FIG. 6A, the axially lower extents or edges 24, 25 of the alignment fixture 8 are secured (e.g., via welding) to respective axial edges or upper face of the arcuate segments 2B and 2C, respectively, such that the tie-rod brackets 20, 21 are directed radially away (i.e., in the direction of the arrow A) from the inner peripheral surface of ring 2 (which is defined by alignment of inner peripheral surfaces 31, 33, 39, 37, respectively of arcuate sections 2A, 2B, 2C, 2D as shown in FIG. 6D). In some embodiments, the tie-rod brackets 20, 21 extend outwardly from the outer peripheral surface of ring 2 (which is defined by alignment of outer peripheral surfaces 32, 34, 40, 41 respectively of arcuate sections 2A, 2B, 2C, 2D). In some embodiments, the alignment fixture 8U is secured to the axial edges of the arcuate segments 2B and 2C in an orientation parallel to a tangent line to the outer peripheral surface of ring 2. However, the present invention is not limited in this regard, as other configurations are contemplated as part of the present invention, including but not limited to the alignment fixture 8U being secured to the axial edges of the arcuate segments 2B and 2C at an angle Q relative to a tangent line to the outer peripheral surface of ring 2, as shown in FIG. 6B.

As shown in FIGS. 6A and 6B, a radially inner edge 41 of the upper arm 27 is positioned radially outward of the inner peripheral surfaces 33, 39 respectively of the arcuate segments 2B and 2C, so that the upper arm 27 (and similarly for the lower arm of fixture 8L) do not interfere with mounting the assembly of arcuate segments 2A, 2B, 2C and 2D around the monopile portion 300. Likewise, having the tie-rod brackets 20, 21 directed radially away from the inner peripheral surface of ring 2 prevents the tie-rod brackets 20, 21 from interfering with mounting the assembly of arcuate segments 2A, 2B, 2C and 2D around the monopile 300. In addition, the heads of the bolts 16, 17, nuts and bolt shafts are positioned radially outward of the inner peripheral surfaces 33, 39 respectively of the arcuate segments 2B and 2C, so that the heads of the bolts 16, 17, nuts and bolt shafts do not interfere with mounting the assembly of arcuate segments 2A, 2B, 2C and 2D around the monopile portion 300.

While tie-rod brackets 20, 21 are shown and described as being directed radially away (i.e., in the direction of the arrow A) from the inner peripheral surface 33, 39 of ring 2 and the tie-rod brackets 20, 21 are shown and described as extending outwardly from the outer peripheral surface of ring 2, the present invention is not limited in this regard as other configurations are contemplated as part of the present invention including having the tie-rod brackets 20, 21 being directed radially inward toward the axis P or extending radially inward from the inner peripheral surface 33, 39, for example in instances where the alignment fixtures/members 8A, 8B, 8C, 8D are removed after the four arcuate segments 1A, 1B, 1C, 1D of anode cage 1 are joined together at dockside and before installation on the monopile.

Upper portions 8U and lower portions 8L of all the other alignment fixtures 8B, 8C, 8D in their locked alignment state are subsequently in like manner installed to be rigidly attached respectively to arcuate sections 2A & 2D, 2D & 2C and 2C & 2B at their respective field splits F. In doing so and as illustrated in FIG. 6D circumferential alignment of arcuate sections 2A, 2B, 2C, 2D of lower annular ring 2 is locked in place, although it will be appreciated that the field splits F remain open/separable. The initial fabrication and alignment of upper annular ring 3 of similarly accomplished and prefabrication of the anode cage 1 is achieved by moving and lifting the rings 2 and 3 to be concentric with its vertical axis P and subsequently welding the plurality of circumferentially distributed anode carriers 4 each carrying its respective sacrificial aluminum anode 5.

However, to ensure that the circularity of ring 2 is maintained, as it is moved about the factory floor for further prefabrication of anode cage 1 or for final quality control checking prior to shipment, a plurality of axially "lower" bracing members 100A, 100B, 100C and 100B are removably attached adjacent the axially lower end thereof to, for example, the associated lower tie-rod bracket of alignment mechanisms 13 immediately adjacent each lower end thereof as hereafter described to and between respectively alignment fixtures 8A & 8B, 8A & 8D, 8D & 8C, and 8C & 8B. For example, bracing member 100A at one lower end at alignment fixture 8A is rigidly attached to of its alignment member 9 adjacent its lower alignment mechanism 13L conveniently through its lower bracket 20L, and similarly the other end of member 100A is rigidly attached to alignment member 10 of fixture 8B through its lower bracket 21L.

It will be understood that the smaller upper annular ring 3 of anode cage 1 is fabricated in like manner to ring 2 but here a corresponding plurality of axially "upper" bracing members 100AU, 100BU, 100CU and 100BU are installed to the associated brackets 20, 21 of the "upper" alignment mechanisms 13 of the corresponding alignment fixtures 8. As can be seen on FIG. 3 the resulting generally parallel and axial spacing of the pairs of bracing members 100A & 100AU, 100B & 100BU, etc., means they are disposed axially remote from anodes 5, i.e., they maintain circularity without interfering with the welding of anode carriers 4 to the annular rings 2, 3, and these bracing members remain in place during transport on truck bed 6 for later removal after dockside final assembly of anode cage 1.

In a simple form the bracing members 100A, 100B, 100C and 100B could be made from strip steel stock or rod tack temporarily tack-welded into place, however, this does require that the arcuate sections 2A & 2D, 2D & 2C and 2C & 2B are perfectly aligned prior to the tack-welding.

For transport on truck bed 6 the alignment mechanisms 13 and 13L of all alignment fixtures 8 associated with both lower ring 2 and upper ring 3 are disassembled, i.e., all bolts 17, 17L, 18, 18L and taper pins 19, 19L are removed. This results in arcuate section 2A having rigidly attached at one end alignment member 9 of the first alignment fixture 8A and rigidly attached at its other end alignment member 10 of the second alignment fixture 8B. Similarly: alignment member 10 of alignment fixture 8A and alignment member 9 of fixture 8D are rigidly attached to respective ends of arcuate section 2B; member 10 of fixture 8D and member 9 of fixture 8C are attached to section 2C, and member 10 of fixture 8C and member 9 of fixture 8B are attached rigidly to section 2D. It will be understood that all the alignment fixtures 8 of upper ring 3 are similarly disassembled and their corresponding alignment members 9, 9L, 10, 10L are each rigidly attached to the respective arcuate section thereof. This results in four prefabricated four arcuate segments 1A, 1B, 1C, 1D of anode cage 1 separated at field splits F which can be loaded onto the truck bed 6 generally as shown in FIG. 3 and transported to a dockside for final assembly of the four arcuate segments 1A, 1B, 1C, 1D prior to sea transport of the assembled anode cage 1 to an awaiting wind tower monopile.

Shipping bracketry to facilitate stable truck transport is illustrated in FIG. 3. This bracketry embodies a further or second aspect of the invention in which the fabrication and transport tooling further comprises a plurality of transport jigs with 200A, 200B being illustrated and attachable to the truck bed 6 with each being adapted to receive for transport respectively the corresponding arcuate segment 1A, 1B, 1C, 1D (only 1A and 1B in transport position being illustrated). The transport jigs 200A, 200B each have an upper surface 201 upon which in transit the underside of axial portions, which carry centrally anodes 5, of associated anode carrier members 4 can rest, with a plurality of forwardly facing lugs 202 and rearwardly facing lugs 203 against which sides immediately adjacent carrier members can bear to prevent respectively relative forward and backward of the corresponding arcuate segment during transit. Conveniently, each arcuate segment in transit is carried upon a pair of near identical transport jigs or beams 200A, 200B fabricated from steel plate of a thickness to facilitate seating of the carrier members 4 in their exposed portions between the anodes 5 and respectively the associated lower ring 2 and upper ring 3. During transit the arcuate segments 1A, 1B, 1C, 1D can be clamped directly or indirectly to the respective transport jig 200A, 200B, or tied down to the truck bed 6 to hold them in place. The beams 200 can be bespoke to a single sized anode cage 1 or adaptable to accommodate at different times two or more differently sized prefabricated anode cage arcuate segments.

At dockside it will be appreciated that the four arcuate segments 1A, 1B, 1C, 1D of anode cage 1, once removed from truck bed 6, can be married (e.g., joined) together at field splits F in rough alignment to facilitate insertion of all bolts 16, 17 of alignment fixtures 8 so that their shanks provide coarse alignment thereof as they are driven home and/or in part tightened by their respective nuts. Thereafter, all taper pins 19, etc., can be inserted each into their respective bores to facilitate fine alignment and the bolts tightened fast to return all alignment fixtures 8 into their locked alignment state. It will be appreciated that initial coarse alignment of all fixtures 8 prior will allow some play to facilitate the fine alignment with the taper pins conveniently inserted in axial pairs to facilitate stepwise alignment. Once all the taper pins are inserted the four prefabricated arcuate segments 1A, 1B, 1C, 1D are concentrically aligned and can then be permanently secured one to another conveniently by welding along opposing chamfered edges 7 or otherwise mechanically connecting immediately adjacent arcuate sections of the annular rings 2 and 3. Once permanently secured the alignment fixtures 8 are redundant and the bracing members can be removed by grinding away the tack-welds, for example. The fixtures 8 can also be removed by grinding away the welds connecting them to immediately adjacent arcuate segments of rings 2, 3 (or removing what-ever other mechanical connection has been employed). However, for convenience the fixtures 8 are considered sacrificial and left in place on anode cage 1. When sacrificial the bolts and taper pins can also be removed leaving only the structural components of fixtures 8 in place. The bracing members, bolts and taper pins can be either scrapped or returned to the factory for use in the prefabrication of another anode cage.

Figure 4:
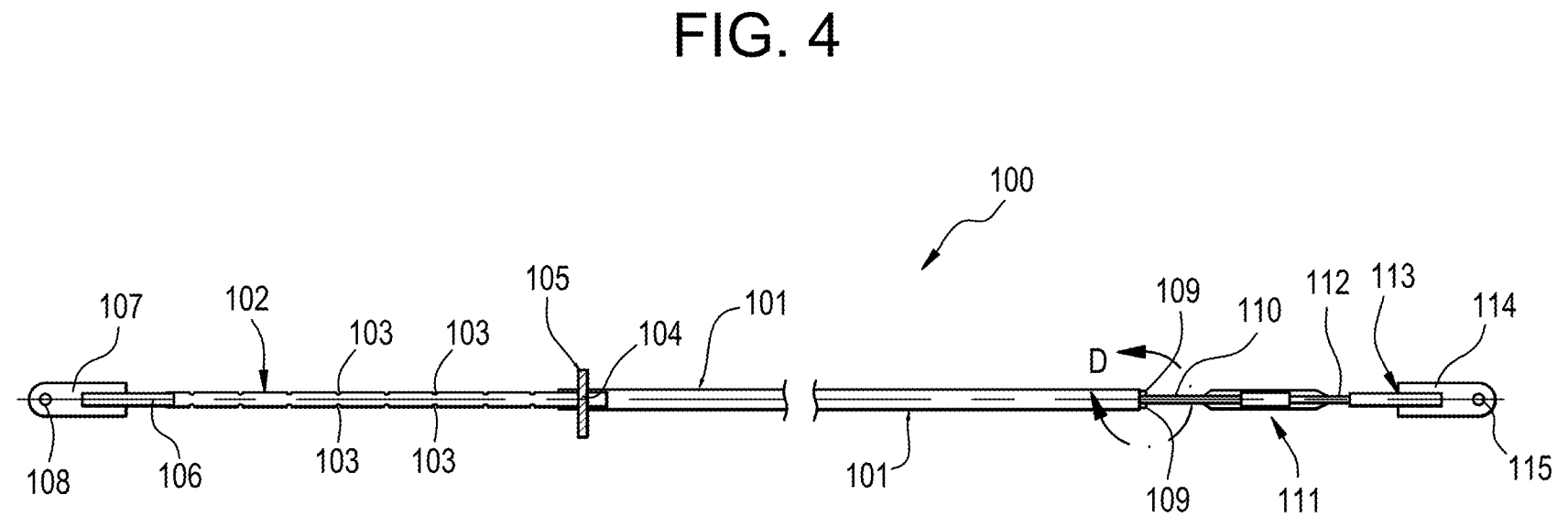

It will be understood that during transport there may be some deformation of the four arcuate segments 1A, 1B, 1C, 1D of anode cage 1 caused by mechanical damage, sagging due to weight and/or thermal expansion/contraction. Thus, there is no guarantee that the various pairs of bracing members 100A & 100AU will maintain the desired circu-larity of the corresponding arcuate segments 1A, 1B, 1C, 1D of the anode cage 1. In practice the arcuate segments 1A, 1B, 1C, 1D may arrive on site marginally distorted, e.g., arcu-ately flattened or stretched, in such manner that coarse alignment of the alignment fixtures 8 is not possible due to misalignment of the bolt holes thereof and some change in length of the installed bracing members is desirable help restore the prefabrication acuate shape to bring the bores for bolts into close enough alignment to drive the shanks of bolts into them to effect the desired coarse alignment of annular rings 2 and 3. To this end in accordance with a further aspect of the invention the bracing members are each comprised of an adjustable tie-rod 100 as illustrated in FIG. 4 and a pair of mechanical fasteners for attaching end thereof to the respective tie-rod brackets of the corresponding alignment fixture 8.

Each or at least one tie-rod 100 comprises a first elongate tube 101 into one end of which extends a second elongate tube 102 having a plurality of pairs of radial aligned bores 103. Adjacent the end of tube 101 which receives one end portion of tube 102 is provided a pair of radial aligned bore 104 through which a locking pin 105 is inserted also through an aligned pair of bores 103 to determine a given desired effective length for tubes 101 and 102 when locked together, i.e., facilitating coarse adjustment of the effective length of tie-rod 100. One such desired effective length might be suitable for arcuate ring 2 and another for arcuate ring 3 of anode cage 1. Different desired lengths might be suitable for another anode cage with upper and lower arcuate rings of entirely different diameters to those of anode cage 1.

The free end of tube 102 remote from tube 101 receives one end of a first bar or tube 106 extending axially therefrom and rigidly attached thereto suitably by welding. Remote from tube 102, bar or tube 106 is similarly rigidly attached to a first buckle 107 through which extends bore 108 of like diameter to bores 22, 23 of tie rod brackets 20, 21. At the free end of tube 101 remote from its connection to tube 102 is mounted a nut 109 into which is received one axially inner end of a first threaded rod 110. The other end of threaded rod 110 is received by one axial end of a turn buckle 111 which has a second threaded rod 112 extending from its other end. The end of rod 112 remote from turnbuckle 111 is received by and rigidly attached to a first end of a second bar or tube 113 attached at its other end to a second buckle 114 through which extends a bore 115 of like diameter to bores 22, 23. It will be readily understood that the ends of any given tie-rod 100 can be secured to the associated alignment fixture 8 by means of aligning bores 113 of buckles 108, 115 with the associated bores 22, 23 of the corresponding tie-rod bracket 20, 21; inserting the shanks of bolts through the aligned bores and then securing them in place by clamping the bolts in place with nuts. Obviously, to insert bolt shanks through both buckles 108, 115 and corresponding tie-rod bracket 20, 21 the tie-rods 100 must be of the correct required effective length facilitated by the aforedescribed appropriate coarse adjustment and then subsequently by fine adjustment facilitated by the turnbuckle 111. The adjustabil-ity of tie-rod 100 facilitates achieving the correct required effective length during fabrication and to accommodate for dimensional changes between the point of initial manufac-ture and the place of final assembly. Thus, dockside adjust-ment of the length of tie-rod 100 can if needed facilitate coarse alignment of the alignment members of alignment fixtures 8 during final assembly with final alignment being as before effected by taper pins 19. Removal of the tie-rods 100 is easily affected by unclamping from the various tie-rod brackets making them available for factory return and reuse.

Early in the innovation process it was appreciated that with dockside assembly costing in the order of three times factory assembly that it was desirable to prefabricate anode cages on the shop floor and then ship by road to the dockside but that doing so with a unitary 10+ meter diameter structure made this impossible. Thus, it was found that prefabrication in arcuate segments was desirable to facilitate onshore transport with final assembly dockside for subsequent off-shore transport to its designated wind tower under construc-tion. Doing so presents a problem insofar as whilst in shopfloor conditions it is relatively easy to accurately locate static jigs about a fixed axis point to facilitate fabrication of arcuate anode cage sections in circular alignment it is not so easy to realign these for final assembly on a dockside under the care of site workers lacking the accurate alignment tools typical in a factory setting. Thus, to ensure accurate align-ment dockside of the arcuate segments avoiding the need for standard alignment tooling it was necessary to have align-ment fixtures which could onsite simply be slotted or otherwise married together. The alignment fixtures 8 solved this problem admirably, but it is envisaged that other align-ment means could be utilized such as overlapping alignment plates, interlocking slit plates or the like.

Additionally, there is no guarantee during transport that the arcuate segments will maintain their shape, thus making accurate alignment to within 0.5 to 2 mm preferably 1 mm tolerance of the weld bevel arrangement at a field split F nigh impossible without some bending of the arcuate seg-ments during final assembly. Such bending is accomplished by using turnbuckle or the like adjustable bracing members such as tie-rod assembly 100 attached to portions of align-ment members at either end of each arcuate segment. It will be appreciated that accurate alignment in relation to the aforedescribed embodiments means correct alignment of opposing pairs of chamfered edges 7 at the respective field split F. Although it is intended in this embodiment of the invention to use the tie-rod assembly 100 together with alignment fixtures 8, it will be understood that other arrange-ments of alignment fixtures comprising bracing members may be utilized within the purview of this aspect of the invention. Similarly, whilst attachment by welding is pre-ferred it could be that other mechanical attachment means could be used during final assembly. After final assembly the bracing members are removable and may be reusable. To facilitate corrosion resistance painting around the field splits F may be undertaken once the bracing members are removed.

Various embodiments are described by the following items:

Item 1. A transport and assembly alignment tool, for fabrication, transport and/or erection/assembly of a plurality of individual near identical arcuate segments (2A, 2B, 2C, etc.) each having an inner and an outer periphery (33, 34 & 35, 36) to manufacture a large annular or toroidal structure or framework:

having at least one alignment fixture (8) with the or each alignment fixture (8) comprising a corresponding matched pair of mating alignment members comprising a first circularity and/or axial alignment member (9) which can align to a second circularity and/or axial alignment member (10), a radially extending alignment feature (19) to determine circumferential alignment of the first and second alignment members (9, 10) when married together and attachment, clamping or locking means (16, 17) to maintain said circumferential alignment;

the first axial alignment member (9) being rigidly secured to a first one of the arcuate segments at or immediately adjacent one circumferential end thereof and the second axial alignment member (10) being rigidly secured to a second one of the arcuate segments at or immediately adjacent one circumferential end thereof.

Item 2. The transport and assembly alignment tool in accordance with item 1, further having at least one of a plurality of bracing members (100) with the or each associated with a corresponding one of the arcuate segments (2A, 2B) for ensuring maintenance of arcuate circularity during transportation and erection/assembly thereof, with the or each bracing member comprising a respective elongate crossmember or tie-rod (100A) having its first and second ends rigidly and removably attachable directly or indirectly to the corresponding arcuate segment respectively at or adjacent to opposing circumferential ends thereof and with the first tie-rod end being in rigidly and removably attachable directly or indirectly to a corresponding one circularity alignment member (9, 10) when disposed adjacent and attached directly or indirectly to said arcuate segment's first end and with another second tie-rod (100B) being similarly attachable to another circularity alignment member (9, 10) similarly disposed and attachable relative to the segment's second end.

Item 3. The transport and assembly alignment tool in accordance with item 1, in which an alignment mechanism (13) of the alignment fixture (8) comprises mechanical fasteners (16, 17) to facilitate coarse alignment of the pair of mating alignment members (9, 10) and a taper pin (19) to facilitate subsequent to insertion of the fasteners fine alignment thereof that can then be maintained by the clamping force of the fasteners (16, 17) once tightened.

Item 4. The transport and assembly alignment tool in accordance with item 2 or item 3, in which the bracing member (100) is adjustable in length.

Item 5. The transport and assembly alignment tool in accordance with any one of the preceding items, further comprising at least one transportation jig or rearwardly extending beam (200) for mounting to a transport truck bed (6) the at least one transportation jig or rearwardly extending beam (200) having an upper surface (201) upon which the underside of an associated axial structural member of the arcuate structure extending between two annular ring segments thereof is configured to rest, a plurality of forwardly facing lugs (202) and rearwardly facing lugs (203) against which immediately adjacent forwardly and rearwardly facing sides of the or a axial structural member can bear to prevent respectively relative forward and backward movement of the corresponding arcuate segment during transit.

Item 6. The transport and assembly alignment tool in accordance with any one of the preceding items adapted to use in the prefabrication, transportation and final assembly of an anode cage for an offshore wind turbine monopile.

Item 7. A method of aligning three contiguous arcuate segments (2B, 2A, 2D) of a large annular structure (2 or 1) during prefabrication, transportation and final assembly using a transport and assembly alignment tool in accordance with any one of the preceding items, in which:

as a first step the arcuate segments (2B, 2A, 2D) are on a shop floor laid out end to end upon a horizontal plane in the correct circular alignment about a reference point (P) with one central segment (2A) being flanked by the other two (2B, 2D), as a second step a first alignment fixture (8A) in a locked alignment state is then attached both to the central segment (2A) and to one flanking segment (2B) with its first alignment member (9) being rigidly attached to the central segment (2A) and with its second alignment member (20) being rigidly attached to the one flanking segment (2B) or vice versa, and a second alignment fixture (8B) in its locked state is then attached both to the central segment (2A) and to the other flanking segment (2D) with the first alignment member (9) of the second alignment fixture being rigidly attached to the central segment (2A) and with its second alignment member (2D) being rigidly attached to the one flanking segment (2B) or vice versa with the rigid attachments being either permanent or temporary, as a third step a bracing member (100A) is rigidly but removably attached at one end thereof directly or indirectly to the alignment member (9 or 10) of the first alignment fixture (8A) attached to central segment (2A) and rigidly but removably attached at its other end directly or indirectly to the alignment member (10 or 9) of the second alignment fixture (8B) attached to the central segment (2A), and as a fourth step readying the central segment (2A) for individual transport by detaching it from the flanking segments (2B, 2D) by disengaging the radially extending alignment features (19) and locking means (16, 17) and separating respective first and second alignment members of the first alignment fixture (8A) and corresponding first and second alignment members of the second alignment fixture (8B) so that they are each in an unlocked or unattached state.

Item 8. The method of aligning three contiguous arcuate segments (2B, 2A, 2D) of a large annular structure (2 or 1) during final assembly in accordance with item 7 in which:

as a fifth step the unlocked or unattached alignment fixtures (8A, 8B) are on-site realigned and brought into and subsequently clamped in their respective locked state to bring the central segment (2A) into circular alignment with both the flanking segments (2B, 2D);

as a sixth step rigidly attaching the flanking segments (2B, 2D) respectively to the central segment (2A) by welding or other functionally permanent mechanical attachments, and as a seventh step removing bracing member (100A) from the transport and assembly alignment tool as shipped.

Item 9. The method on accordance with item 8, in which the bracing member (100A) is an adjustable tie-rod or strut (100), the alignment fixture has an alignment mechanism (13) in which mechanical fasteners (16, 17) facilitate coarse alignment thereof and an axially extending alignment feature (19, 15) subsequently facilitates fine alignment and having:

a subsidiary step between the fifth and sixth step wherein the tie-rod (100) is adjusted in length to facilitate coarse alignment of the alignment mechanism (13).

Item 10. The method of transporting at least a one of the arcuate segments (2B, 2A, 2D) of the large annular structure (2 or 1) according to any one of items 7 to 9, in which a transportation jig in accordance with item 5 is utilized.

Item 11. The transport and assembly alignment tool of item 1, wherein the alignment fixture (8) comprises a first mounting leg (24) and a second mounting leg (25) on an axial edge thereof and the first mounting leg (24) is secured to a first axial end of a first of the arcuate segments (2A) and the second axial leg (25) is secured to a second axial end of a second of the arcuate segments (2B).

Item 12. The transport and assembly alignment tool of item 11, wherein the alignment fixture (8) comprises a first tie-rod bracket (20) extending radially outward therefrom and a second tie-rod bracket (21) extending radially outward therefrom.

Item 13. The transport and assembly alignment tool of item 12, wherein the first tie-rod bracket (20) extends radially outward from an inner peripheral surface (33) of the first of the arcuate segments (2A) and the second tie-rod bracket (21) extends radially outward from the inner peripheral surface (33) of the second of the arcuate segments (2B).

Item 14. The transport and assembly alignment tool of item 13, wherein the first mounting leg (24) is positioned entirely radially outward from the inner peripheral surface (33) of the first of the arcuate segments (2A) and the second mounting leg (25) is positioned entirely radially outward from the inner peripheral surface (33) of the second of the arcuate segments (2B).

Item 15. The transport and assembly alignment tool of item 11, wherein the alignment fixture (8) is oriented substantially parallel to a tangent line to an outer peripheral surface (34) of the first of the arcuate segments (2A) and the second of the arcuate segments (2B).

Item 16. The transport and assembly alignment tool of item 11, wherein the alignment fixture (8) is oriented at a non-zero angle relative to a tangent line to an outer peripheral surface (34) of the first of the arcuate segments (2A) and the second of the arcuate segments (2B).

Item 17. A modular prefabrication of an anode cage (1) or large annular/toroidal structure/framework being an arcuate segment thereof prefabricated, transported and/or assembled together with other such modular prefabrications (e.g., 1A, 1B, 1C, 1D) utilizing the transport and assembly alignment tool of item 6 and/or in accordance with the method of any one of items 7 to 10.

Item 18. A modular prefabrication or arcuate segment in accordance with item 17, being one of at least three such near identical prefabrications being transportable as a matched set on the flatbed (6) of a road going truck.

Item 19. A modular prefabrication of an anode cage (1) or large annular/toroidal structure/framework being one of at least three such near identical prefabrications being transportable as a set on the flatbed (6) of a road going truck.

Item 20. A method of prefabricating, transporting and finally assembling an anode cage (1) or large annular/toroidal structure/framework utilizing a plurality of prefabrications each in accordance with any one of items 17 to 19.

Item 21. A kit for use in assembling an anode cage (1) or large annular/toroidal structure/framework, the kit comprising at least two near identical prefabrications and at least two alignment fixtures (8).

Item 22. The kit of item 21, further comprising mechanical fasteners.

Item 23. The kit of item 21 or item 22, further comprising at least one elongate bracing member.

Item 23. The kit according to item 22, wherein the at least two bracing alignment fixtures are configured to align and connect adjacent ones of the at least two near identical prefabrications to one another.

Item 24. The kit according to item 23, wherein the at least one elongate bracing member is configured to connect to two of the alignment fixtures (8).

The embodiments of the invention described relate to alignment and shipping tooling suitable for anode cage prefabrication, transportation, and final assembly. It is envisaged that without departing from the features of the invention as herein described that tooling of similar design and function being other embodiments of the invention could be utilized in the prefabrication, transportation and final assembly of any large cylindrically framed, frustoconical or toroidal structure where maintaining circularity during prefabrication and final assembly of generally annular structural components or sub-assemblies thereof is essential. Typically, such large structures will have a plurality of annular rings or structural members axially spaced apart by cross-members or like structural elements. Creating, maintaining and/or reinstating the required geometry for the desired circularity is not necessarily dependent on the use of the aforedescribed welded connections and other functionally equivalent mechanical alignment and/or attachment means can be envisaged without departing from the intended scope and utility of the invention.

As will be apparent to those skilled in the art, various modifications, adaptations, and variations of the foregoing specific disclosure can be made without departing from the scope of the invention claimed herein. The various features and elements of the invention described herein may be combined in a manner different than the specific examples described or claimed herein without departing from the scope of the invention. In other words, any element or feature may be combined with any other element or feature in different embodiments, unless there is an obvious or inherent incompatibility between the two, or it is specifically excluded.

References in the specification to "one embodiment," "an embodiment," etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described.

The singular forms "a," "an," and "the" include plural reference unless the context clearly dictates otherwise. Thus, for example, a reference to "a plant" includes a plurality of such plants. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition, or step being referred to is an optional (not required) feature of the invention.

The term "and/or" means any one of the items, any combination of the items, or all of the items with which this term is associated. The phrase "one or more" is readily understood by one of skill in the art, particularly when read in context of its usage.

Terms that refer to direction or position, i.e., vertical, horizontal, upper, lower, etc., are used for convenience for the reader and are not meant to limit the structure or function of the invention in any manner unless specifically stated herein.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third, and upper third, etc.

As will also be understood by one skilled in the art, all language such as "up to," "at least," "greater than," "less than," "more than," "or more," and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

What is claimed is:

1. A transport and assembly alignment tool, for prefabrication, transport, erection and final assembly of a separate plurality of individual near identical arcuate segments each having an inner periphery and an outer periphery manufacture a large annular or toroidal structure or framework, which during final assembly enables the circumferential alignment and facilitates subsequent permanent attachment of the arcuate segments end-to-end to create an annulus or ring that can maintain its circularity and structural integrity without the external support of the tool permitting post-assembly removal of the tool;

having at least one alignment fixture with the or each alignment fixture comprising a corresponding matched pair of mating first and second alignment members separate and distinct from the arcuate segments comprising a first circularity axial alignment member which can mate and align circumferentially to a second circularity and axial alignment member, a radially extending alignment feature to determine circumferential and tangential alignment of the first and second alignment members when married together and attachment, clamping or locking means to maintain said circumferential alignment and mating contact of the alignment members;

the first axial alignment member adapted in use to be rigidly but removably secured to a first one of the arcuate segments at or immediately adjacent one circumferential end thereof and similarly the second axial alignment member being rigidly but removably secured to a second one of the arcuate segments at or immediately adjacent one circumferential end thereof;

wherein a first portion of the first circularity axial alignment member and a second portion of the second circularity axial alignment member each extend radially outward from the outer periphery.

2. The transport and assembly alignment tool in accordance with claim 1, further having at least one of a plurality of bracing members with the or each associated with a corresponding one of the arcuate segments for ensuring maintenance of arcuate circularity during transportation and erection/assembly thereof, with the or each bracing member comprising a respective elongate crossmember or tie-rod having its first and second ends rigidly and removably attachable directly or indirectly to the corresponding arcuate segment respectively at or adjacent to opposing circumferential ends thereof and with the first tie-rod end being in rigidly and removably attachable directly or indirectly to a corresponding one circularity alignment member when disposed adjacent and attached directly or indirectly to said arcuate segment's first end and with another second tie-rod being similarly attachable to another circularity alignment member similarly disposed and attachable relative to the segment's second end;

wherein the first end is removably attached to the first portion of the first circularity axial alignment member and the second end is removably attached to the second portion of the second circularity axial alignment member.

3. The transport and assembly alignment tool in accordance with claim 2, in which the bracing member is adjustable in length.

4. The transport and assembly alignment tool in accordance with claim 1, in which an alignment mechanism of the alignment fixture comprises mechanical fasteners to facilitate coarse alignment of the pair of mating alignment members and the radially extending alignment feature to facilitate subsequent to insertion of the fasteners fine alignment thereof that can then be maintained by the clamping force of the fasteners once tightened.

5. The transport and assembly alignment tool in accordance with claim 1 adapted to use in the prefabrication, transportation and final assembly of an anode cage for an offshore wind turbine monopile.

6. A method of aligning at least three of the arcuate segments of a large annular structure during prefabrication, transportation and final assembly using a transport and assembly alignment tool in accordance with claim 1, in which:

as a first step the arcuate segments are laid out end to end upon a horizontal plane in the correct circular alignment about a reference point with a first of the arcuate segments being flanked by the at least a second of the arcuate segments and a third of the arcuate segments, as a second step a first alignment fixture in a locked alignment state is then attached both to the first of the arcuate segments and to a second of the arcuate segments with the first alignment member being rigidly attached to the first of the arcuate segments and with the second alignment member being rigidly attached to the second of the arcuate segments or vice versa, and a second alignment fixture in its locked state is then similarly attached both to the first of the arcuate segments and to the third of the arcuate segments with the first alignment member of the second alignment fixture being rigidly attached to the first of the arcuate segments and with the second alignment member being rigidly attached to the second of the arcuate segments or vice versa with the rigid attachments being either permanent or temporary, as a third step a bracing member is rigidly but removably attached at one end thereof directly or indirectly to the first alignment member of the first alignment fixture attached to the first of the arcuate segments and rigidly but removably attached at its other end directly or indirectly to the second alignment member of the second alignment fixture attached to the first of the arcuate segments, and as a fourth step readying the first of the arcuate segments for individual transport by detaching it from the second and third of the arcuate segments by disengaging the radially extending alignment features and locking means and separating respective first and second alignment members of the first alignment fixture and corresponding first and second alignment members of the second alignment fixture so that they are each in an unlocked or unattached state.

7. The method of aligning at least three contiguous arcuate segments of a large annular structure during final assembly in accordance with claim 6, in which:

as a fifth step the unlocked or unattached alignment fixtures are on-site realigned and brought into and subsequently clamped in their respective locked state to bring a first arcuate segment into circular alignment with a second arcuate segment and a second arcuate segment;

as a sixth step rigidly attaching the second and third arcuate segments respectively to the first arcuate segment by welding or other functionally permanent mechanical attachments, and as a seventh step removing bracing member from the transport and assembly alignment tool as shipped.

8. The method on accordance with claim 7, in which the bracing member is an adjustable tie-rod or strut, the alignment fixture has an alignment mechanism in which mechanical fasteners facilitate coarse alignment thereof and an axially extending alignment feature subsequently facilitates fine alignment and having:

a subsidiary step between the fifth and sixth step wherein the tie-rod is adjusted in length to facilitate coarse alignment of the alignment mechanism.

9. A modular prefabrication of an anode cage or large annular/toroidal structure/framework being an arcuate segment or module thereof prefabricated, transported and/or assembled together with other such modular prefabrications providing the alignment tool of claim 1 and utilizing the transport and assembly alignment tool in accordance with the method of claim 6 and being one of at least three such near identical prefabrications being transportable as a matched set on the flatbed of a road going truck.

10. A modular prefabrication of an anode cage or large annular/toroidal structure/framework in accordance with claim 9, in which accurate alignment to within a desired degree of tolerance of contacting arcuate end faces or portions of the prefabrications required for permanent attachment thereof during final assembly is facilitated by means of a plurality of alignment fixtures, corresponding to the number of arcuate prefabrications, with each fixture comprising a respective adjustable bracing member removably attachable adjacent the arcuate end faces or portions of the arcuate prefabrication to which it corresponds and which is in use disposed radially inwardly of that arcuate prefabrication to be adjustable in length to ensure the effective radius of that arcuate prefabrication is brought into tolerance prior to the permanent attachment.

11. A method of aligning at least three contiguous arcuate segments of a large annular structure during prefabrication, transportation and final assembly using a transport and assembly alignment tool in accordance with claim 1, in which:

as a first step the arcuate segments are on a horizontal plane in the correct circular alignment about a reference point with a first of the arcuate segments being flanked by the at least a second and a third of the arcuate segments, as a second step a first alignment fixture in a locked alignment state is then attached both to the first arcuate segment and to the second arcuate segment with a first alignment member being rigidly attached to the first of the arcuate segments and with second alignment member being rigidly attached to the second of the arcuate segments or vice versa, and a second alignment fixture in its locked state is then similarly attached both to the first of the arcuate segments and to the a third of the arcuate segments with the first alignment member of the second alignment fixture being rigidly attached to the first of the arcuate segments and with its second alignment member being rigidly attached to the second of the arcuate segments or vice versa with the rigid attachments being either permanent or temporary, and as a third step a bracing member is rigidly but removably attached at one end thereof directly or indirectly to the alignment member of the first alignment fixture attached to first of the arcuate segments and rigidly but removably attached at its other end directly or indirectly to the alignment member of the second alignment fixture attached to the first of the arcuate segments and adjusting the member to ensure correct alignment of the opposing ends of the alignment members, and as a fourth step readying the first of the arcuate segments for individual transport by detaching it from the second and third arcuate segments by removing the bracing member, disengaging the radially extending alignment features and locking means and separating respective first and second alignment members of the first alignment fixture and corresponding first and second alignment members of the second alignment fixture so that they are each in an unlocked or unattached state.

12. The method of aligning at least three contiguous arcuate segments of a large annular structure during final assembly in accordance with claim 11, in which:

as a fifth step the unlocked or unattached alignment fixtures are on-site realigned with the aid of the or a bracing member, brought into and then subsequently clamped in their respective locked state to bring the first of the arcuate segments into circular alignment with both the second and third of the arcuate segments and opposing ends of the alignment members are correctly aligned at a respective field split;

as a sixth step rigidly attaching the second and third of the arcuate segments respectively to the first of the arcuate segments by welding or other functionally permanent mechanical attachments, and as an optional last step the alignment fixtures may be detached from the fully assembled large annular structure.

13. The transport and assembly alignment tool of claim 1, wherein the alignment fixture comprises a first mounting leg and a second mounting leg on an axial edge thereof and the first mounting leg is secured to a first axial end of a first of the arcuate segments and the second axial leg is secured to a second axial end of a second of the arcuate segments and wherein the first mounting leg is positioned entirely radially outward from the inner peripheral surface of the first of the arcuate segments and the second mounting leg is positioned entirely radially outward from the inner peripheral surface of the second of the arcuate segments.

14. The transport and assembly alignment tool of claim 1, wherein during transport, the arcuate segments are spaced apart from and not attached to one another.

\* \* \* \* \*